United States Patent [19]
Mitchell et al.

[11] Patent Number: 6,137,188
[45] Date of Patent: Oct. 24, 2000

[54] METHOD FOR SHARED VOLTAGE REGULATION WITH MULTIPLE DEVICES

[75] Inventors: Craig G. Mitchell, Mt. Prospect; Christian A. D'Souza, Rolling Meadows; Michael P. Dempsey, Chicago, all of Ill.; Chandra S. Pandey, Lowell, Mass.

[73] Assignee: 3Com Corporation, Santa Clara, Calif.

[21] Appl. No.: 09/322,837

[22] Filed: May 28, 1999

[51] Int. Cl.[7] ............................................. H02J 4/00
[52] U.S. Cl. ................................. 307/29; 307/40; 326/54
[58] Field of Search .............................. 307/29, 125, 38, 307/40, 85, 86; 326/104, 105, 54

[56] References Cited

U.S. PATENT DOCUMENTS 5,986,538  11/1999  Yoon ........................................... 326/54

OTHER PUBLICATIONS

"5–Bit Programmable Synchronous Switching Regulator Controller for Pentium® II Processor", Linear Technology, LTC 1553, 1994, pp. 1–24.
VRM 8.3 DC–DC Converter Design Guidelines, Intel®, Mar. 1999, Order No. 243870–002, pp. 1–14.
Pentium Processor® with MMX™ Technology, Chapter 9.0 Electrical Specifications, Intel®, 1997, pp. 21–36.
Embedded Pentium® Processor Family Developer's Manual, Chapter 18.0 Hardware Interface, Intel®, 1998, pp. 18–1 to 18–65.

*Primary Examiner*—Stephen W. Jackson
*Assistant Examiner*—Rios Roberto
*Attorney, Agent, or Firm*—McDonnel Boehnen Hulbert & Berghoff

[57] ABSTRACT

Disclosed is a system and method for supplying power to multiple devices using a single voltage regulator. The present invention includes a comparator that compares the voltage identification codes from multiple devices in a system. If all the devices have the same value for the voltage identification code, then the comparator forwards the code to a voltage identification input of a programmable voltage regulator, which then outputs a power supply voltage at a level corresponding to the voltage identification code value of the devices. If any device present in the system has a different value for its voltage identification code, then the comparator outputs a predetermined value to the programmable voltage regulator that prevents the voltage regulator from outputting a power supply voltage.

9 Claims, 4 Drawing Sheets

METHOD FOR SHARED VOLTAGE REGULATION WITH MULTIPLE DEVICES

FIELD OF INVENTION

The present invention relates to power supply to devices. More specifically, it relates to the provision of a regulated power supply to multiple devices, such as microprocessors.

BACKGROUND OF THE INVENTION

Microprocessors typically require a regulated voltage supply having a particular voltage level. FIG. 1 is a simplified block diagram of a system 100 having a microprocessor 110 and a voltage regulator 150 that provides a power supply voltage to the microprocessor.

Microprocessor 110 is an example of a processor having a voltage identification VID signal 112 that specifies the operating voltage of the processor. Voltage regulator 150 receives the VID signal 112 and outputs a supply voltage VCC 152 to processor 110. Voltage regulator 150 is connected to a input voltage VIN and a ground voltage VSS from which it produces the supply voltage VCC at the level specified by the VID signal.

Different types of processors can have different supply voltage requirements. Even different parts of the same processor can have different voltage requirements, such as a supply voltage required for a processor core and another voltage required for a level 2 cache. The supply voltage of a processor may be changed by a manufacturer for a variety of reasons, such as to optimize performance, increase production yields, and reduce power consumption.

In addition, it is desirable to design a single board, such as a motherboard, to accept many different processors. Thus, it is important that voltage regulators be designed to provide the voltage level specified by the VID signal 112 of the processor 110. See *VRM 8.3 DC—DC Converter Design Guidelines*, Order No. 243870-002, and *Pentium® Processor Flexible Motherboard Design Guidelines*, Order No. 243187, Intel Corp., Santa Clara, Calif. Voltage regulators have been developed that have a digitally programmable output voltage that can be controlled by the VID signal of a processor. See the LTC1553 5-bit Programmable Synchronous Switching Regulator Controller for Pentium II Processor, Linear Technology Corp., Milpitas, Calif., www.linear-tech.com.

In multiprocessor systems, each processor typically requires its own voltage regulator. Each voltage regulator provides the supply voltage specified by the VID signal of its corresponding processor. However, this increases the number of chips required in the multiprocessor design. Therefore, the need remains for a way to reduce the number of voltage regulators needed for a multiprocessor system.

SUMMARY OF THE INVENTION

In accordance with preferred embodiments of the present invention, some of the problems associated with supplying a regulated voltage to multiple processors are overcome.

An embodiment of a system for supplying power to multiple devices, according to the present invention, includes a comparator having a first input for receiving a first voltage identification signal from a first device, a second input for receiving a second voltage identification signal from a second device, and an output for outputting a voltage control signal. The comparator is configured to generate a predetermined value at the output of the comparator responsive to a value of the first voltage identification signal being different from a value of the second voltage identification signal. The comparator is further configured to forward the value of the first voltage identification signal to the output of the comparator responsive to when the value of the first voltage identification signal matches the value of the second voltage identification signal. The system also includes a programmable voltage regulator having a first power input for receiving a first power supply voltage, a second power input for receiving a second power supply voltage, a voltage control input coupled to the output of the comparator, and a power supply output for outputting a power supply voltage to the first and second devices. The programmable voltage regulator is configured to output a voltage level at the power supply output responsive to a voltage control signal received at the voltage control input. The voltage regulator will produce one of a predetermined power supply voltage level when it receives the predetermined value and a power supply voltage level corresponding to the value of the first voltage identification signal.

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

The present invention is directed toward a system and method for supplying voltage to multiple processors using a single voltage regulator. In the present invention, the VID signal of 0 from each of multiple processors is routed to a comparator that compares the value of the VID signals. If the comparator determines that all the processors have the identical VID signal value, then the comparator forwards the VID signal value to a voltage regulator which then supplies power to all the processors. If the VID signals are not identical, then the comparator prevents the voltage regulator from supplying power to the processors.

The present invention takes advantage of the observation that, once a processor board is shipped, the VID signals of the processors rarely change. Thus, a common voltage regulator can be used to provide a common power supply for multiple processors of the same type. If a processor having a different VID signal value is introduced to a processor board that already includes processors, then the comparator will prevent damage to the processors in the board.

Figure 1:
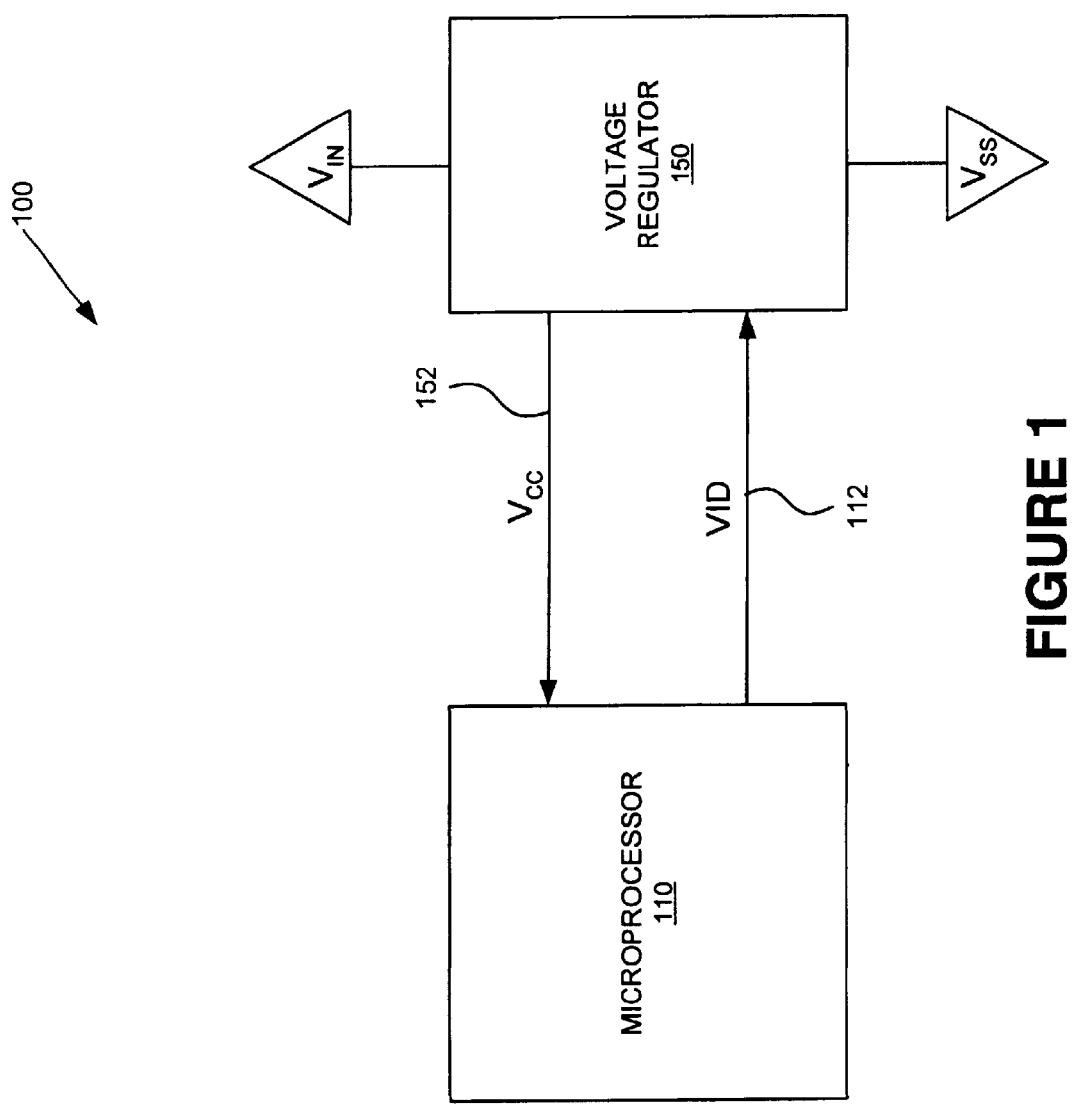
FIG. 1 is a block diagram illustrating an example of a conventional processor and voltage regulator system.
Figure 2:
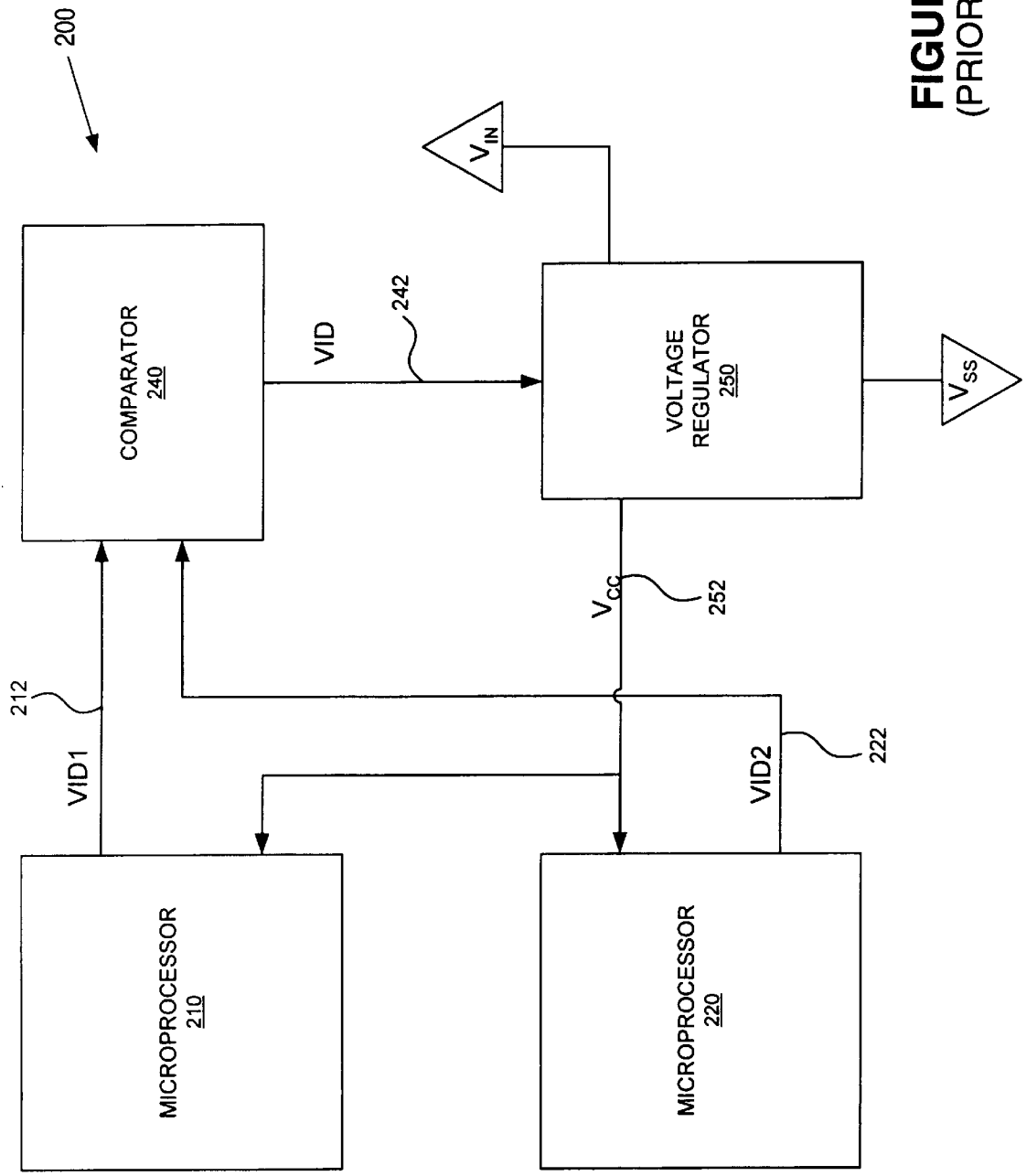
FIG. 2 is a block diagram of an embodiment of a multiple processor architecture according to the present invention.

FIG. 2 illustrates a simplified multiple processor architecture 200 according to the present invention. Microprocessors 210 and 220 in architecture 200 are similar to microprocessor 110 of FIG. 1. Microprocessor 210 outputs a first VID signal VID1 on connection 212 to comparator 240. Microprocessor 220 outputs a second VID signal VID2 on connection 222 to comparator 240.

Comparator 240 compares the values of VID1 and VID2 and, if the values are identical, forwards the identical value of VID1 and VID2 as VID signal 242 to voltage regulator 250. If the values of VID1 and VID2 are not identical, then comparator 240 outputs a value for VID signal 242 that disables voltage regulator 250 or controls another circuit, such as a switch or buffer, that is capable of disabling voltage regulator 250.

Voltage regulator 250 will output a VCC supply voltage 252 that is determined by the value of the VID signal 242 from comparator 240. For example, the Intel Pentium II processor has a five-bit voltage identification code, i.e. VID0–4, that the processor outputs. The VRM 8.3 DC—DC Converter Design Guidelines set forth a table that describes the relationship between a supply voltage level provided by a regulator and the VID received by the regulator. Thus, if voltage regulator 250 receives a value of "11010", for VID4, VID3, VID2, VID1 and VID0, respectively, for VID signal 242, then the regulator will output 2.5 volts for VCC. However, if comparator 240 outputs "11111" for VID signal 242, then regulator 250 will output 0 volts for VCC.

Figure 3:
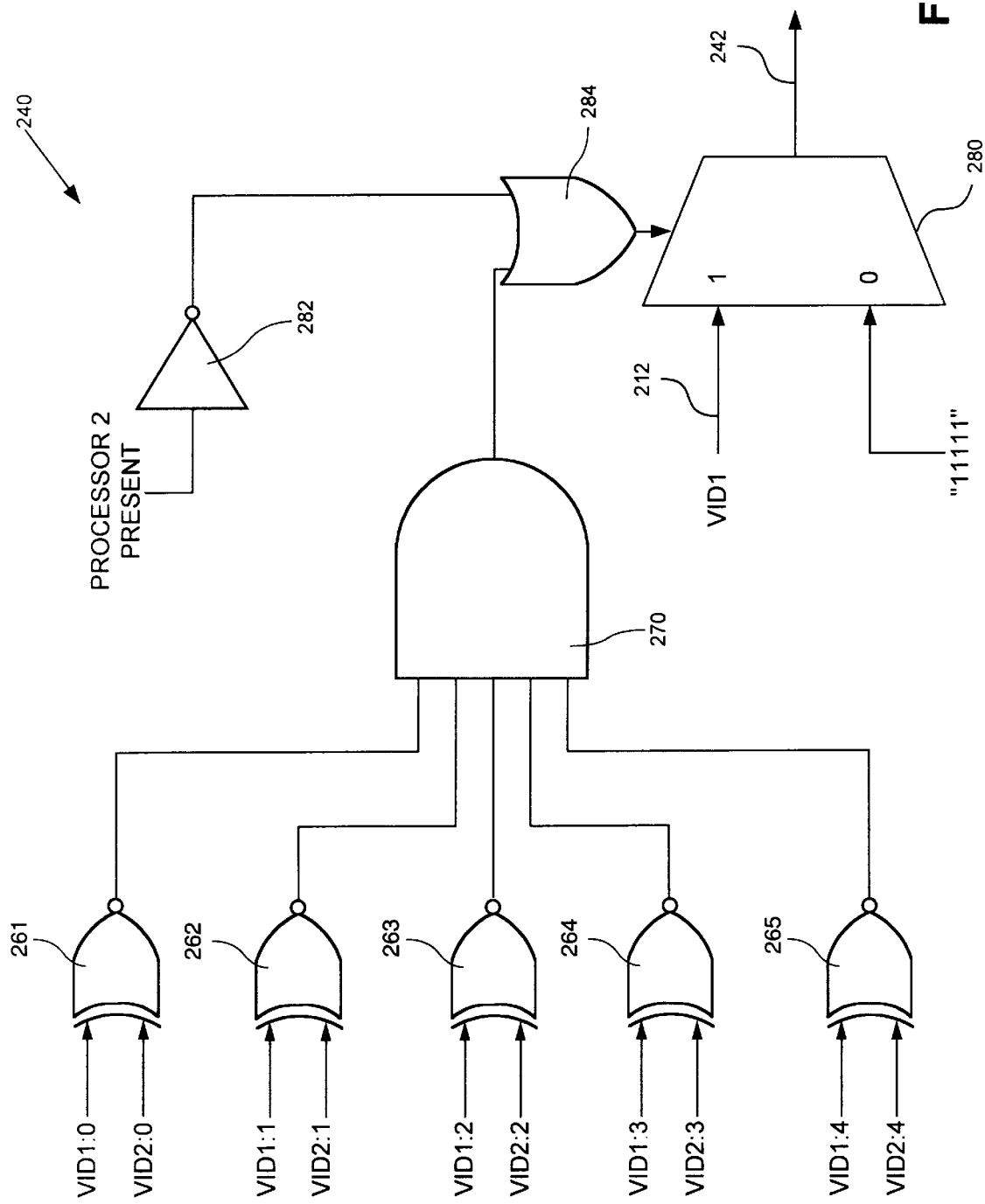
FIG. 3 is a logic diagram of one embodiment of the comparator circuit of FIG. 2.

FIG. 3 is a block diagram illustrating an embodiment of comparator 240. A first XNOR gate 261 receives a first bit of VID1 signal 212, VID1:0, at a first input and a first bit of VID2 signal 222, VID2:0, at a second input. XNOR gate 261 will output a logical 1 only if both VID1:0 and VID2:0 have the same logical value. XNOR gates 262, 263, 264 and 265 similarly compare the second, third, fourth and fifth bits of the VID1 and VID2 signals. The outputs of XNOR gates 261–265 are input to AND gate 270. Thus, the output of AND gate 270 will be logical 1 only when all of the bits of the VID1 and VID2 signals match.

The output of AND gate 270 is coupled to a control terminal of multiplexor (MUX) 280 through OR gate 284. OR gate 284 also receives the output of inverter gate 282. Inverter gate 282 is driven by a PROCESSOR 2 PRESENT signal that indicates whether processor 220 is present. This signal is typically available from a microprocessor to indicate whether the chip is in place in the circuit when there is an optional processor socket. If the PROCESSOR 2 PRESENT signal is inactive, then processor 220 is not present, the output of inverter gate 282 is driven high thereby driving the output of OR gate 284 high and selecting VID1 for output by MUX 280. When the PROCESSOR 2 PRESENT signal is active, then the output of inverter gate 282 is low and OR gate 284 will pass the value of the output of AND gate 270 to the control terminal of MUX 280.

When the output of AND gate 270 is driven high, i.e. logical 1, then the output of OR gate 284 is forced high and VID1 signal 212 connected to a first input of MUX 280 is passed through to an output of MUX 280 which drives the VID signal 242. As a result, the identical value of the VID1 signal 212 and VID2 signal 222 is output to regulator 250 which generates a corresponding voltage level for VCC 252.

When the output of AND gate 270 is logical 0, then the values of VID1 and VID2 are not identical and a value of "11111" input to a second input of MUX 280 is passed to the output of MUX 280 and onto VID signal line 242. Thus, when the values of VID1 and VID2 are not identical, then the value "11111" is output to regulator 250 in order to inhibit power up of processors 210 and 220.

Figure 4:
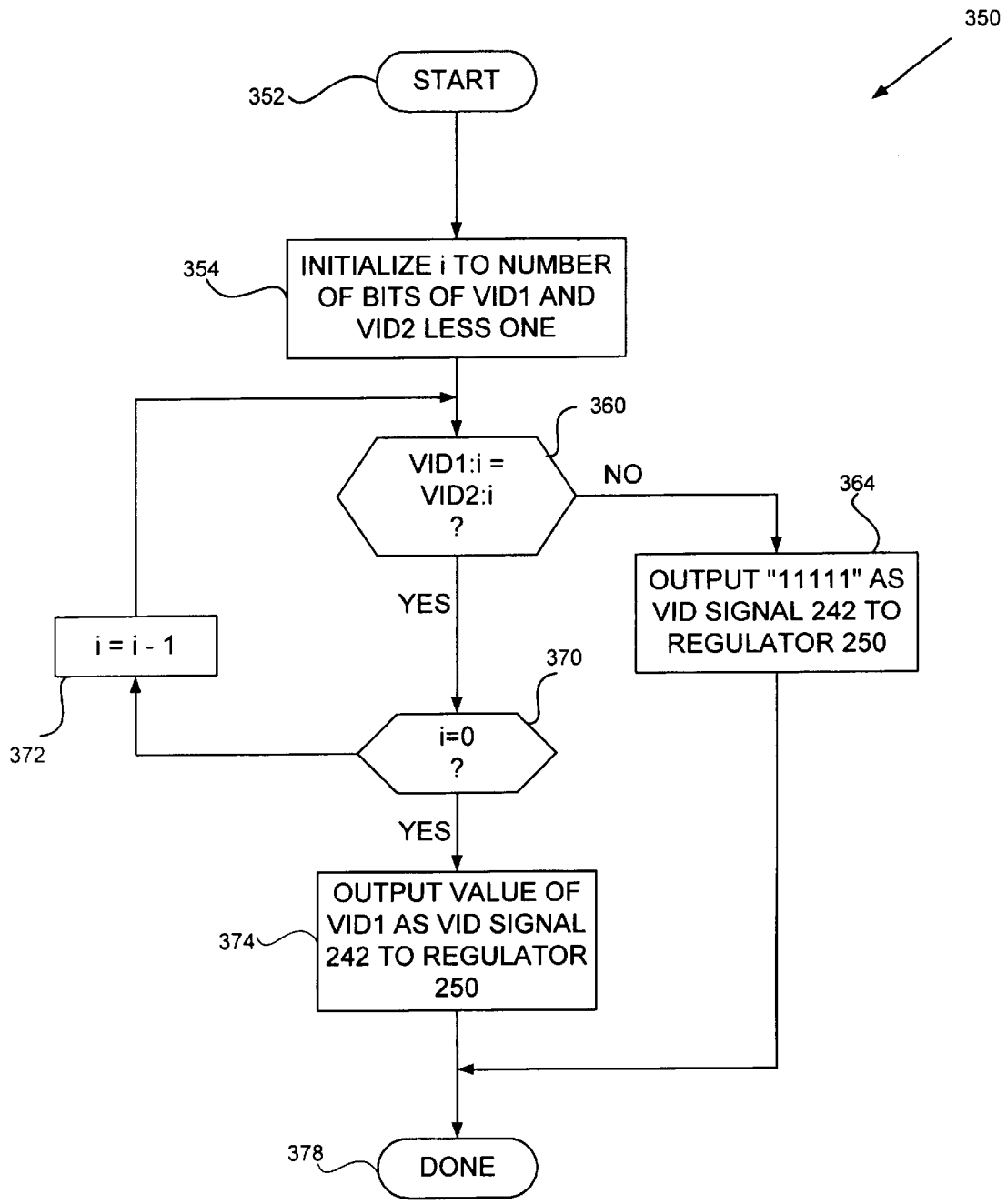
FIG. 4 is a flow diagram illustrating another embodiment the comparator of FIG. 2.

FIG. 4 is a flow diagram illustrating the operational flow 350 of another embodiment of comparator 240. Control flow enters at step 352 when input voltage VIN is introduced to the architecture 200 of FIG. 2. Comparator 240 first initializes i at step 354 to the number of bits of the VID1 signal 212 and VID2 signal 222 less one, i.e. the highest order bit of VID1 and VID2.

Then, at step 360, the VID1:i bit is compared to the VID2:i bit. If the values of the bits are not the same, then control branches to step 364 where the value "11111" is output to regulator 250. If the values of the bits are the same, then control flow branches to step 370 to determine whether all the bits of the VID1 and VID2 signals have been compared. If this is not the least significant bit of the VID1 and VID2 signals, then i is decremented at step 372 and control returns to step 360 to check the next bit.

If i=0 at step 370, then all the bits of VID1 and VID2 have been compared and are identical. The value of VID1 is therefore output to regulator 250 at step 374 and the comparison process 350 is complete at step 378.

In addition to the embodiments illustrated above, the present invention can be adapted to work on a circuit board or other circuit where a second processor is optionally present, i.e. an empty socket that can accept another processor. When only one processor is present, the VID signal will be driven with the VID of the first processor instead of the "11111" code, which requires minimal modification of the embodiments above.

Also, the present invention can be used in an electronic system that contains multiple subsystems that are designed with the capability for generating a voltage identification signal that indicates the power supply requirements for each subsystem. While the present invention is described above in the context of multiple processors, the present invention can be applied to other modular structures.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein. In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or components may be used in the block diagrams. In addition, the present invention can be practiced with software, hardware, or a combination thereof. The claims should not be read as limited to the described order or elements unless stated to that effect. Therefore, all embodiments that come within the scope and spirit of the following claims and equivalents thereto are claimed as the invention.

We claim:

1. A system for supplying power to multiple devices, the system including:

a comparator having a first input for receiving a first voltage identification signal from a first device, a second input for receiving a second voltage identification signal from a second device, and an output for outputting a voltage control signal, where the comparator is configured to generate a predetermined value at the output of the comparator responsive to a value of the first voltage identification signal being different from a value of the second voltage identification signal, and where the comparator is further configured to forward the value of the first voltage identification signal to the output of the comparator responsive to when the value of the first voltage identification signal matches the value of the second voltage identification signal; and a programmable voltage regulator having a first power input for receiving a first power supply voltage, a second power input for receiving a second power supply voltage, a voltage control input coupled to the output of the comparator, and a power supply output for outputting a power supply voltage to the first and second devices, the programmable voltage regulator being configured to output a voltage level at the power supply output responsive to a voltage control signal received at the voltage control input, where the voltage regulator will produce one of a predetermined power supply voltage level when it receives the predetermined value and a power supply voltage level corresponding to the value of the first voltage identification signal.

2. The system of claim 1, where the comparator further comprises:

a finite series of XNOR logic gates, each XNOR logic gate having first and second inputs and an output, where the first input of each XNOR logic gate is for receiving a corresponding bit of the first voltage identification signal and the second input of each XNOR logic gate is for receiving a corresponding bit of the second voltage identification signal;

an AND logic gate having a finite series of inputs and an output, where each input of the AND logic gate is coupled to the output of a corresponding one of the finite series of XNOR logic gates; and a multiplexor having first and second inputs, a control input and an output, where the first input is for receiving the first voltage identification signal, the second input is for receiving the predetermined value, the control input of the multiplexor is coupled to the output of the AND logic gate, and the output of the multiplexor is coupled to the voltage control input of the comparator.

3. The system of claim 2, where the comparator further includes an OR gate having first and second inputs and an output, the OR gate being interposed the control input of the multiplexor and the output of the AND gate such that the first input of the OR gate is coupled to the output of the AND gate and the output of the OR gate is coupled to the control input of the multiplexor, and where the second input of the OR gate is for receiving a device present signal that will have a logic high value when the second device is not present.

4. The system of claim 1, where the comparator is further configured to:

compare each bit of the first voltage identification signal to a corresponding bit of the second voltage identification system;

generate the predetermined value at the output of the comparator if any bit of the first voltage identification signal does not match the corresponding bit of the second voltage identification system; and generate the first voltage identification signal at the output of the comparator if every bit of the first voltage identification signal matches the corresponding bit of the second voltage identification system.

5. The system of claim 1, where the first and second devices are processors.

6. A method for providing a power supply voltage to multiple devices, the method comprising the steps:

receiving a first voltage identification signal from a first device;

receiving a second voltage identification signal from a second device;

comparing a value of the first voltage identification signal to a value of the second voltage identification signal;

generating a voltage control signal having a predetermined value when the value of the first voltage identification signal does not match the value of the second voltage identification signal;

forwarding the value of the first voltage identification signal as the voltage control signal when the value of the first voltage identification signal does match the value of the second voltage identification signal;

outputting a power supply voltage to the first and second devices responsive to the voltage control signal when the voltage control signal is the value of the first voltage identification signal, where a voltage level of the power supply voltage corresponds to the value of the first voltage identification signal; and blocking the power supply voltage to the first and second devices when the voltage control signal is the predetermined value.

7. The method of claim 6, further including the step of detecting that the second device is not present and, responsive thereto, forwarding the value of the first voltage identification signal as the voltage control signal.

8. A system for controlling voltage to multiple devices, the system comprising:

means for receiving a first voltage identification signal from a first device;

means for receiving a second voltage identification signal from a second device;

means for comparing the first and second voltage identification signals;

means for providing a power supply voltage to the first and second devices, where a voltage level of the power supply voltage corresponds to a value of the first voltage identification signal when the value of the first voltage identification signal matches a value of the second voltage identification signal; and means for blocking the power supply voltage to the first and second devices when the value of the first voltage identification signal does not match the value of the second voltage identification signal.

9. The system of claim 8, where the first and second devices are processors.

* * * * *